US010441018B2

(12) United States Patent
Akhmad et al.

(10) Patent No.: US 10,441,018 B2
(45) Date of Patent: Oct. 15, 2019

(54) HELMET FOR COMMUNICATIONS

(71) Applicant: BAE SYSTEMS plc, London (GB)

(72) Inventors: Mohammed-Asif Akhmad, Chelmsford Essex (GB); James Edwin Gerard, Chelmsford Essex (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 15/753,737

(22) PCT Filed: Aug. 31, 2016

(86) PCT No.: PCT/GB2016/052694
§ 371 (c)(1),
(2) Date: Feb. 20, 2018

(87) PCT Pub. No.: WO2017/037451
PCT Pub. Date: Mar. 9, 2017

(65) Prior Publication Data

US 2018/0249780 A1 Sep. 6, 2018

(30) Foreign Application Priority Data

Sep. 1, 2015 (EP) .................................... 15275195
Sep. 1, 2015 (GB) .................................. 1515485.9

(51) Int. Cl.
*H04R 1/04* (2006.01)
*H04B 1/3827* (2015.01)
(Continued)

(52) U.S. Cl.
CPC .............. *A42B 3/30* (2013.01); *A42B 3/0473* (2013.01); *H04R 1/1075* (2013.01);
(Continued)

(58) Field of Classification Search
CPC ... H04R 1/02; H04R 1/04; H04R 1/46; H04B 1/385
See application file for complete search history.

(56) References Cited

U.S. PATENT DOCUMENTS 3,787,641 A 1/1974 Santori
5,136,657 A 8/1992 Hattori
(Continued)

FOREIGN PATENT DOCUMENTS

DE 9003237 U1 5/1990
GB 2295291 A 5/1996
(Continued)

OTHER PUBLICATIONS

International Preliminary Report on Patentability received for PCT Application No. PCT/GB2016/052694, dated Mar. 15, 2018. 7 pages.
(Continued)

*Primary Examiner* — Blane J Jackson
(74) *Attorney, Agent, or Firm* — Finch & Maloney PLLC

(57) ABSTRACT

A helmet for communications comprising: a helmet member for at least partially covering the user's head; a strap for extending around the user's lower jaw and thereby securing the helmet member to the user; wherein the strap comprises a transducer unit for contacting the user's lower jaw and thereby transmitting vibrations to the user.

20 Claims, 3 Drawing Sheets

(51) Int. Cl.

| | |
|---|---|
| ***H04R 1/46*** | (2006.01) |
| ***A42B 3/30*** | (2006.01) |
| ***H04R 1/10*** | (2006.01) |
| ***H04R 5/033*** | (2006.01) |
| ***A42B 3/04*** | (2006.01) |

(52) U.S. Cl.

CPC ......... *H04R 1/1083* (2013.01); *H04R 5/0335* (2013.01); *H04R 2201/107* (2013.01); *H04R 2420/07* (2013.01); *H04R 2460/13* (2013.01)

(56) References Cited

U.S. PATENT DOCUMENTS

| | | | | |
|---|---|---|---|---|
| 6,463,157 | B1 * | 10/2002 | May | H04R 1/083 310/324 |
| 6,999,732 | B2 * | 2/2006 | Fukuda | A42B 1/245 381/151 |
| 8,194,875 | B2 * | 6/2012 | Miranda | A42B 3/14 381/151 |
| 2003/0083112 | A1 | 5/2003 | Fukuda et al. | |
| 2006/0227982 | A1 * | 10/2006 | Miranda | A42B 3/14 381/151 |
| 2006/0277664 | A1 | 12/2006 | Akhtar et al. | |
| 2009/0046874 | A1 * | 2/2009 | Doman | H04R 25/00 381/151 |
| 2013/0180033 | A1 | 7/2013 | Uemoto et al. | |
| 2015/0130945 | A1 * | 5/2015 | Yu | H04N 7/181 348/158 |
| 2016/0296839 | A1 * | 10/2016 | Brav | G06F 3/012 |

FOREIGN PATENT DOCUMENTS

| | | | |
|---|---|---|---|
| JP | 2000013883 | A | 1/2000 |
| JP | 2014150891 | A | 8/2014 |
| WO | 2010005045 | A1 | 1/2010 |
| WO | 2017037451 | A1 | 3/2017 |

OTHER PUBLICATIONS

International Search Report and Written Opinion received for PCT Application No. PCT/GB2016/052694, dated Nov. 15, 2016. 10 pages.

GB Search Report received for GB Application No. 1515485.9, dated Feb. 3, 2016. 2 pages.

Extended European Search Report received for EP Application No. 15275195.4, dated Feb. 29, 2016. 6 pages.

* cited by examiner

HELMET FOR COMMUNICATIONS

The following invention relates to a helmet for communications.

It is known to provide a helmet which has integrated into it an audio listening device which transmits sound waves to the user by agitating the air in the user's auditory canal (which may alternatively be referred to as the ear canal). Such devices tend to occlude or otherwise cover the auditory canal.

According to the present invention there is provided a helmet for communications comprising: a helmet member for at least partially covering the user's head; a strap for extending around the user's lower jaw and thereby securing the helmet member to the user; wherein the strap comprises a transducer unit for contacting the user's lower jaw and thereby transmitting vibrations to the user.

As such the helmet permits covert reception of communications (e.g. vibratory signals) or enables reception of communications where ambient noise may interfere with reception. Surprisingly this is possible when signals are applied through the lower jaw; it might be expected that such communications are only possible where signals are applied to non-articulated bones of the skull. Indeed, transmission through the lower jaw allows the user to move their jaw to alter contact with the transducer at will.

The transducer unit for contacting the user's jaw may be operable to in response to an input electrical signal generate sound waves in the human hearing range.

The transducer unit for contacting the user's jaw may be operable to in response to an input electrical signal generate sound waves across a sufficient band of the human hearing range such that voice messages may be transmitted and understood.

The helmet may further comprise a communication module operably connected to the transducer unit and being adapted to receive or generate an electrical signal for conversion into a sound wave in the human hearing range.

The communication module may be adapted to communicate wirelessly with the user's personal radio.

As such the helmet may tend to be more lightweight.

The strap may further comprise a chin guard, wherein the transducer unit is housed at the chin guard.

Such a provision can further facilitate retrofitting of the device into existent helmets. Further, the provision of the device in the chin guard conveniently tends to position the transducer unit proximate to the users jaw bone.

The transducer unit may comprise a contact member arranged to protrude from a surface of the chin guard or strap and thereby contact the user.

The helmet may further comprise an auditory canal isolation device.

As such the helmet offers protection from ambient noise, which may be distracting or damagingly loud.

Optionally, not only is the transducer unit for generating sound waves in the human hearing range, and not only does the helmet comprise a communication module operably connected to the transducer unit and being adapted to receive or generate an electrical signal for conversion into a sound wave in the human hearing range, but also the helmet further comprises at least one microphone, the microphone being operably connected to the communication module such that ambient sounds picked-up by the microphone may be converted to electrical signals and fed to the transducer unit.

Such a provision enables an attenuated version of the ambient sound to be fed to the user without exceeding dangerous sound levels which could damage hearing. The unit may comprise a thresholding module for attenuating ambient sounds above a certain level.

The transducer unit may comprise a haptic unit for generating vibrations which may tend to be below the human hearing frequency range.

Such a provision enables simple instructions to be fed to the user. For instance if the unit was in communication with a geo-positioning module, a particular haptic feedback signal (e.g. a low frequency prodding of the jaw) could alert the user to proximity to a certain location.

The transducer unit may comprise at least two individually operable transducers.

Such a provision allows more complex instructions to be fed to the user. For instance if two audio transducer units were provided, stereo sounds or signals could be provided to the user. For instance if two haptic units were provided to the left and right of the jaw, the activation of the left unit may instruct the user to turn left.

The transducer unit may comprise an array of individually operable transducers.

Such a provision allows more complex instructions to be fed to the user. For instance if an array of haptic transducer units was provided, then the range of instructions fed to the user would increase. For instance, an array could fire in a 'Mexican wave' fashion from left to right to instruct the user to turn right. For instance an array of audio transducer units could provide a three-dimensional sound effect to the user.

According to a second aspect of the invention there is provided a headset system comprising: a strap for extending around a user's jaw and thereby securing a helmet member; a transducer arranged at the strap for contacting the user's jaw and transmitting vibrations into the user's jaw; a communications module operably connected to the transducer; and a portable communication device arranged to transmit signals to the communications module.

The communications module may comprise an antenna and a receiver, and the portable communication device comprises an antenna and signal transmitter, such that the portable communication device is arranged to transmit signals to the communications module wirelessly.

The portable communications module may be arranged to receive signals from a remote base station.

So that the invention may be understood at least one embodiment of the invention is described as follows and with reference to the Figures of which:

Figure 3A:
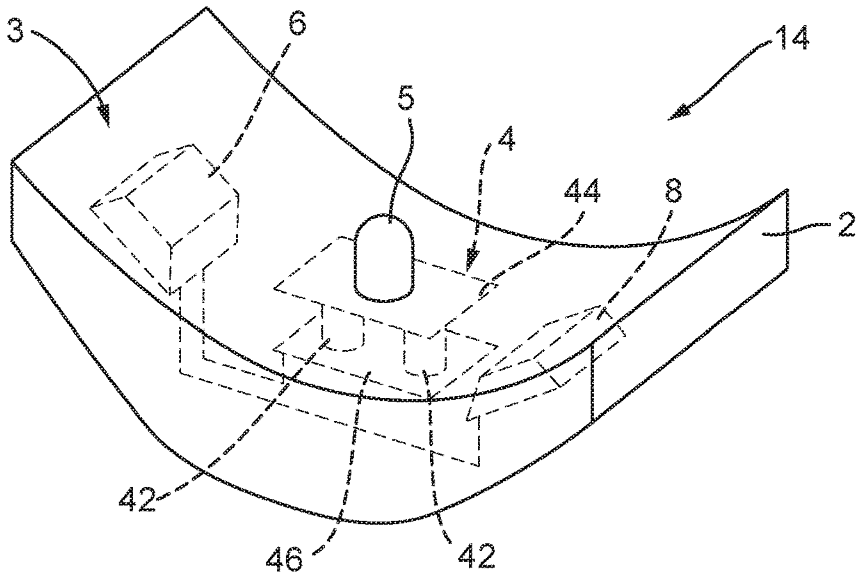
Figure 3B:
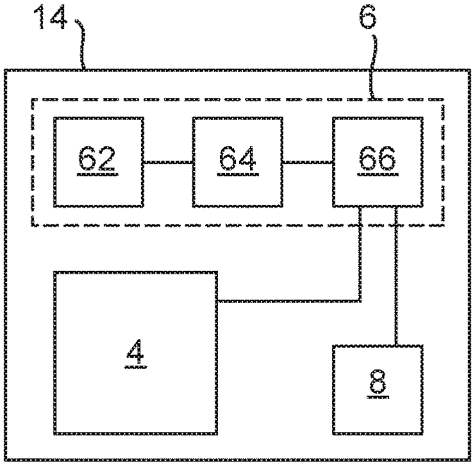
Figure 4A:
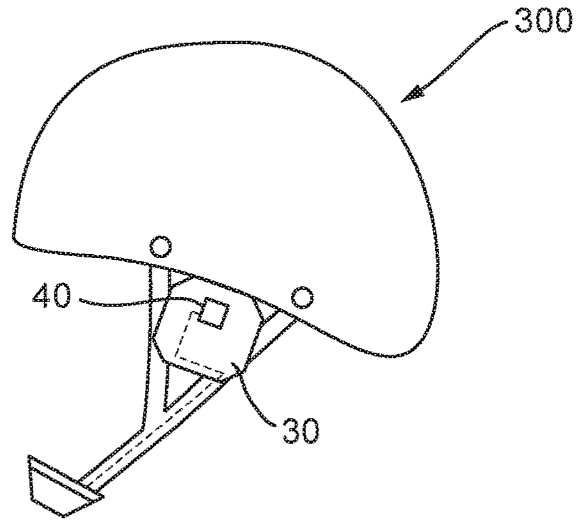
Figure 4B:
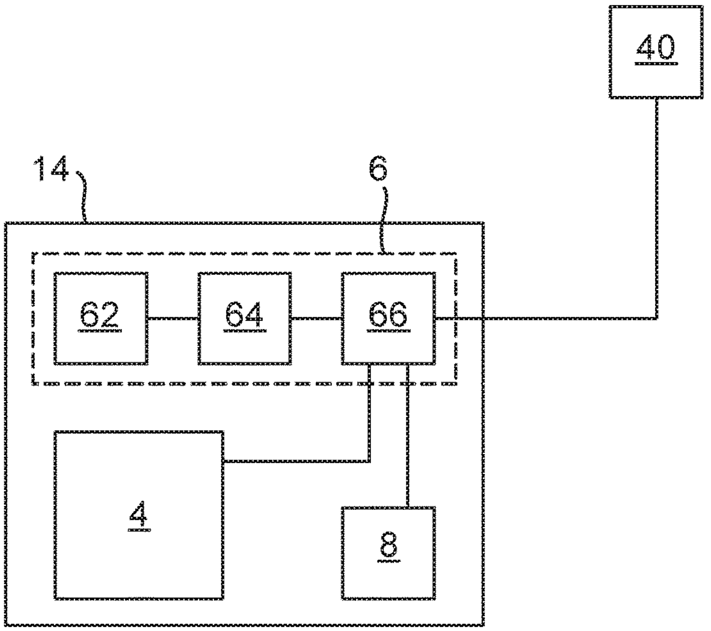

FIG. 3*a* shows a close-up three-dimensional representation of an aspect of the helmet comprising the bone conduction audio unit;

FIG. 3*b* shows a schematic diagram of a bone conduction audio unit;

FIG. 4*a* shows a side-on view of a helmet according to a second embodiment of the invention; and FIG. 4*b* shows a schematic diagram of a bone conduction audio unit associated with the second embodiment of the invention.

The following description is based on embodiments of the invention and should not be taken as limiting the invention with regard to alternative embodiments that are not explicitly described herein.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

It will be appreciated that relative terms such as top and bottom, upper and lower, and so on, are used merely for ease of reference to the Figures, and these terms are not limiting as such, and any two differing directions or positions and so on may be implemented.

Figure 1:
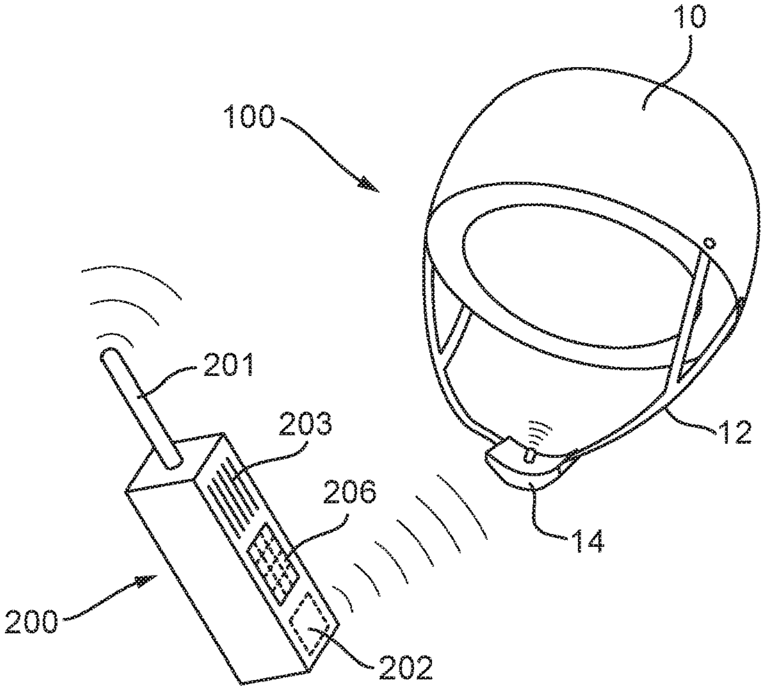
FIG. 1 shows a three dimensional representation of a helmet according to an embodiment of the invention comprising a bone conduction audio unit, and also shows an associated mobile communications device.
Figure 2:
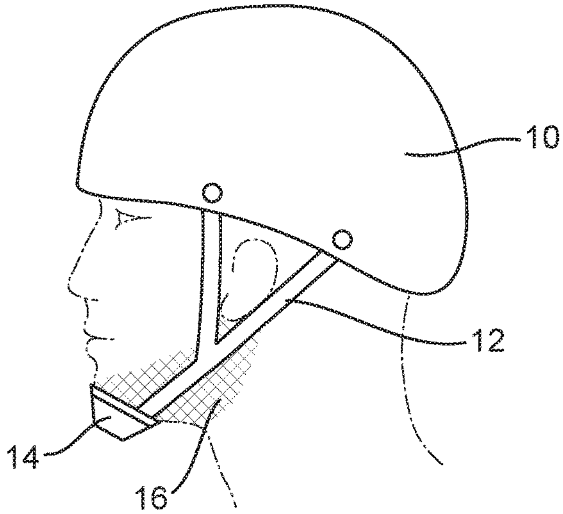
FIG. 2 shows a side-on view of a helmet according to an embodiment of the invention as it may be worn by a user.

With reference to FIGS. 1 and 2, there is shown generally at 100 a helmet comprising a helmet member 10, a strap 12, and a bone conduction audio unit 14.

The helmet member 10 is configured such that when worn it can partially cover the user's head, and in particular tends to cover the user's neurocranium whilst leaving the facial bones, including the mandible (lower jaw), uncovered.

The strap 12 has a first end which connects to a first (for instance left) side of the helmet member 10 and a second end which connects to a second (for instance right) side of the helmet member 10. Each end is bifurcated so as to attach at two points of the side of helmet.

Interconnecting the first and second ends of the strap 12 is a central strap portion which hangs below the helmet member 10 such that it may contact the chin and/or the underside of the lower jaw of the user.

The chin and jaw area of the user (i.e. the lower jaw) is shown approximately in FIG. 2 with the cross-hatched area 16. The reader would understand that the chin and jaw area would be the parts of the face proximate to the mandible bone.

The bone conduction audio unit 14 is at substantially the middle point of the central strap portion such that it may contact the chin and/or underside of the jaw of the user (as such the bone conduction audio unit is provided with a suitable housing 2 so as to function as a chin guard). The bone conduction audio unit 14 may be engaged with the strap 12 such that it may slide freely along the strap 12 but is constrained to stay on the strap.

Also shown in FIG. 1 is portable communication device 200, which may alternatively be referred to as a personal radio 200. Personal radio 200 comprises a first transceiver 201 for longer range wireless communications with remote base stations (e.g. according to any one or combination of GSM standard, UMTS standards, LTE standard protocols) and a second transceiver 202 for nearby wireless communications (e.g. according to any one or combination of the IEEE 802.11 or 'WiFi™' standard, IEEE 802.1ad or 'WiGig™' standard, and IEEE 802.15.1 'Bluetooth™' protocols). The personal radio 200 further comprises a speaker 203 and a user interface 206. The speaker 203, the first transceiver 201 and the second transceiver 202 may be selectively activated by the user interface 206.

Referring to FIGS. 3*a* and 3*b*, the bone conduction audio unit 14 is shown as comprising a housing 2, a bone conduction transducer unit 4, a communication module 6 and a power supply 8. In particular, the power supply is a battery.

The bone conduction transducer unit 4, communication module 6 and power supply 8 are substantially or entirely contained by the housing 2. An upper surface 3 of the housing defines a recess into which the chin or jaw of the user may fit. The lower surface of the housing protects the unit 14 and the user's chin. As such the housing 2 provides a chin guard for the helmet 10.

The bone conduction transducer unit 4 comprises a contact member 5 which protrudes through the upper surface 3 of the housing 2 such that it is biased to press at skin and flesh and onto the lower jaw of the user. The contact member 5 is resiliently mounted to ensure that it can exert sufficient pressure on the user to transmit sound waves, without being so stiff as to cause significant discomfort. Alternative embodiments of the bone conduction audio unit 14 may be absent the contact member 5, and instead rely on the intimate contact between the upper surface of the housing 2 and the user in order to transmit vibratory signals.

The transducer unit 4 further comprises a base plate 46 fixed to the housing 2, an actuator 42 (shown as a pair of actuators in FIG. 3*a*) fixed at its first end to the base plate 46, and a top plate 44 attached to the other end of the actuator 42. The actuator 42 may be a magnetostrictive actuator arrangement.

The contact member 5 is mounted on the top plate 44.

The communications module 6 comprises an antenna 62, a receiver 64 and a signal processor 66.

The antenna 62 is configured to receive nearby wireless signals and relay these as electrical signals to the signal processor 66 via the receiver 64. Accordingly the antenna 62 is operably connected to the receiver 64 and the receiver 64 is connected to the signal processor 66.

The signal processor 66 is configured to convert audio bearing electrical signals from the receiver 64 into electrical audio signals which can be fed directly to the bone conduction transducer unit 4. Accordingly, the processor 66 is connected to the bone conduction transducer unit 4.

The communications module 6 is operably connected to the power supply 8.

In operation a user may wear the helmet 100 with the helmet member 10 generally covering their neurocranium and the chin guard 2 on the strap 12 contacting their chin. In particular, the strap is slung around the user's lower jaw such that contact member 5 presses at skin and flesh onto the user's lower jaw (mandible).

As discussed above, the communications module 6 is interfaced with the personal radio 200 such that the communications module 6 is able to receive signals from the personal radio 200. (Optionally, it may be possible to transmit data from the antenna 62 to the personal radio 200.)

With the helmet 100 arranged thus, the user may then use the interface 206 to place the personal radio 200 in a 'covert relay operation' condition where the speaker 203 is inactive but both the first and second transceivers 201, 202 are active. As such, any signals (e.g. such as may bear audio messages) sent to the personal radio 200 can be received at the first receiver 201 and retransmitted by the second transceiver 202.

Where signals bearing an audio message are retransmitted by the second transceiver 202 in such a way, it will be received by the communications module 6 of the bone conduction audio unit 14, transmuted into an electrical audio signal and fed into the bone conduction audio actuator unit 4 which further transmutes the electrical audio signal into a sound wave which is of small amplitude but which, by virtue of being in intimate contact with the user's jawbone may be clearly perceived by conduction of the sound waves (vibratory signals) through the skull. Indeed the applicant has found that, surprisingly, voice messages can be clearly understood when delivered through the bone conduction audio device 14 in the above manner.

An alternative helmet is shown generally at 300 in FIG. 4*a*. The helmet 300 is generally equivalent to helmet 100 but is additionally provided with auditory canal isolation devices 30 (ACID). An ACID 30 is provided on each side of the helmet 300, one for each ear.

The ACID 30 is in the form of an earmuff which is attached to the helmet member 10 such that it covers the user's ear and shields the user's auditory canal from the ambient air such that ambient sound waves are significantly attenuated by the time they propagate into the auditory canal.

The helmet 300 is further provided with a microphone 40, on an exterior surface of the helmet 300, for transducing ambient sound waves into electrical audio signals. As shown in FIG. 4*a*, the microphone 40 is mounted on the ACID 30.

With additional reference to FIG. 4*b*, the microphone 40 is operably connected to the processor 66 in the communication module 6 of the bone conduction audio device 14.

A user may operate helmet 300 in a noise reduction mode as follows.

Firstly the user wears the helmet 300 such that each ACID 30 covers an ear and the strap 12 is slung under the jaw such that the bone conduction transducer 4 (or specifically the contact member 5) is in contact with the user's jaw.

Secondly, the microphone 40 is activated so as to relay electrical audio signals relating to ambient sound to the processor 66 in the communication module 6.

In noise reduction mode, such signals relating to the ambient sound are relayed to the bone conduction transducer unit 4 to be reconstructed as sound waves for user interpretation.

In noise reduction mode, the helmet 300 may still mix in with the ambient sounds the audio messages received from the personal radio 200.

In alternative embodiments the helmet may further comprise, instead of or in addition to the bone conduction transducer unit 4, another form of transducer unit. For example one other form of force feedback unit contemplated would be a haptic transducer for relaying signals to the user by tactile feedback.

Thus it is contemplated that in variants of the above embodiments, the transducer unit 4 may be configured to, in addition or in place of high quality audio message transmission capable of relaying voice messages to the user, produce haptic signals to the user. Such haptic signals could be a 'buzz' or 'prodding' sensation as the transducer oscillates at a frequency below that of the human hearing range.

In operation such haptic signals could be predetermined to inform the user of certain events or circumstances. For instance a haptic signal could alert the user to the battery charge level dropping below a 'low battery' threshold (where the power supply 8 is a battery).

It is also contemplated that variants of the above embodiments could provide an array of independently operable transducer units, each equivalent to transducer unit 4, each comprising a contact member.

Where two or more bone conduction audio transducers were provided a stereo (for example if two bone conduction audio transducers were provided) or 3-Dimensional sound effect could be provided to the user.

Where an array of haptic transducers were provided, the unit 14 could be drive so as to create a ripple sensation (by triggering a 'mexican wave'—or sequential firing of transducers from one end to the other—across a plurality of contact points) to provide an instruction to the user.

The helmet member may be fabricated from one or more of any known helmet member material such as metals, expanded polystyrene, polycarbonate, glass-reinforced polymer, Kevlar® and leather. The helmet member may entirely cover the neurocranium or a portion thereof, or alternatively the helmet member may be provided with vents, holes or other discontinuities.

The strap may be fabricated from interwoven nylon strands, though other plastics materials and natural polymers (e.g. cotton) could be used.

In variants on the above described helmet, the helmet may tend not to comprise a rigid chin guard and instead the transducer unit 4 could be integrated into the strap itself as a low-profile pad.

In other variants of the above helmet, the helmet may be provided with a microphone for picking up voice commands from the user. Such commands, having been picked up by the microphone, could be relayed onwards via the personal radio much in the opposite manner to which incoming signals are relayed to the helmet.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The description of example embodiments of a helmet and its applications provided above is intended to demonstrate a number of principles for the design and operation of such a helmet, both explicit and implied. The specific examples of functionality and features described may be applied in any reasonably foreseeable selection or combination consistent with those design principles and the scope of the present invention as claimed below is intended to include all such selections and combinations.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A helmet for communications, the helmet comprising:

a helmet member for at least partially covering a user's head;

a strap for extending around the user's lower jaw and thereby securing the helmet member to the user;

a transducer unit attached to the strap and for contacting the user's lower jaw and thereby transmitting vibrations to the user; and a communication module operably coupled to the transducer unit and being adapted to receive an audio bearing electrical signal, and convert the audio bearing electrical signal to an electrical audio signal that is applied to the transducer unit, wherein the communication module is further adapted to communicate wirelessly with a mobile communication device, and wherein the communication module is within a chin guard.

2. The helmet according to claim 1 wherein the transducer unit for contacting the user's lower jaw is operable to, in response to the electrical audio signal, generate sound waves in the human hearing range.

3. The helmet according to claim 1 wherein the transducer unit for contacting the user's lower jaw is operable to, in response to the electrical audio signal, generate sound waves across a sufficient band of the human hearing range such that voice messages may be transmitted and understood.

4. The helmet according to claim 1 wherein the transducer unit is within the chin guard.

5. The helmet according to claim 4 wherein the chin guard is part of or slideably attached to the strap.

6. The helmet according to claim 1 wherein the strap further comprises a chin guard, and wherein the transducer unit is housed at the chin guard.

7. The helmet according to claim 6 wherein the transducer unit comprises a contact member arranged to protrude from a surface of the chin guard and thereby contact the user.

8. The helmet according to claim 1 wherein the transducer unit comprises a haptic unit for generating vibrations below the human hearing frequency range.

9. The helmet according to claim 1 wherein the transducer unit comprises at least two individually operable transducers.

10. The helmet according to claim 1 wherein the transducer unit comprises an array of individually operable transducers.

11. A helmet for communications, the helmet comprising:

a helmet member for at least partially covering the user's head;

a strap for extending around the user's lower jaw and thereby securing the helmet member to the user;

a transducer unit attached to the strap and for contacting the user's lower jaw and thereby transmitting vibrations to the user; and an auditory canal isolation device.

12. The helmet according to claim 11 the transducer unit being for generating sound waves in the human hearing range, the helmet further comprising:

a communication module operably connectable to the transducer unit and being adapted to receive or generate an electrical signal for conversion into a sound wave in the human hearing range; and at least one microphone, the microphone being operably connected to the communication module such that ambient sounds picked-up by the microphone may be converted to electrical signals and fed to the transducer unit.

13. A headset system comprising:

a strap for extending around a user's lower jaw and thereby securing a helmet member;

a transducer arranged at the strap for contacting the user's lower jaw and transmitting vibrations into the user's lower jaw;

a communications module operably connected to the transducer and comprising an antenna and a receiver, wherein the communications module is within a chin guard; and a portable communication device arranged to transmit signals to the communications module, wherein the portable communication device comprises an antenna and transmitter, such that the portable communication device is arranged to transmit signals to the communications module wirelessly.

14. The headset system according to claim 13 further comprising the helmet member.

15. The headset system according to claim 13 wherein the portable communications module is arranged to receive signals from a remote base station.

16. A helmet for communications, the helmet comprising:

a helmet member for at least partially covering a user's head;

a strap for extending around the user's lower jaw so as to secure the helmet member to the user, the strap including a chin guard; and a transducer unit within the chin guard of the strap so as to be proximate the user's lower jaw, the transducer unit including a contact member arranged to protrude from a surface of the chin guard and thereby transmit vibrations to the user's lower jaw in response to an input signal.

17. The helmet according to claim 16, further comprising:

a receiver circuit operably connected to the transducer unit and adapted to receive wireless audio bearing electrical signals and to convert those audio bearing electrical signals into input signals which are fed to the transducer unit.

18. The helmet according to claim 17 wherein the receiver circuit is adapted to receive the wireless audio bearing electrical signals from a mobile communication device.

19. The helmet according to claim 16 where the transducer unit is configured to generate sound waves in the human hearing range, the helmet further comprising:

a receiver circuit operably connected to the transducer unit and adapted to receive wireless audio bearing electrical signals and to convert those audio bearing electrical signals unit into a sound wave in the human hearing range; and at least one microphone, the microphone being operably connected to the receiver circuit such that ambient sounds picked-up by the microphone may be converted to electrical signals and fed to the transducer unit.

20. The helmet according to claim 16 wherein the transducer unit comprises an array of individually operable transducers.

* * * * *